(12) United States Patent
Gaster

(10) Patent No.: US 6,851,523 B1
(45) Date of Patent: Feb. 8, 2005

(54) SHOCK ABSORBING VEHICLE WHEEL CHOCK

(76) Inventor: Ivan Gaster, 201 Richard Ct., Union, OH (US) 45322

( * ) Notice: Subject to any disclaimer, the term of this patent is extended or adjusted under 35 U.S.C. 154(b) by 0 days.

(21) Appl. No.: 10/679,779

(22) Filed: Oct. 6, 2003

(51) Int. Cl.$^7$ ................................................. B60T 3/00
(52) U.S. Cl. ................................ 188/32; 410/9; 410/30
(58) Field of Search ................... 188/32, 36; 410/30, 410/9, 4, 13, 26, 24, 20, 7–8

(56) References Cited

U.S. PATENT DOCUMENTS

| | | |
|---|---|---|
| 4,786,223 A | 11/1988 | Crissy et al. |
| 5,302,063 A | 4/1994 | Winsor |
| 5,312,213 A | 5/1994 | Winsor |
| 5,465,814 A * | 11/1995 | Ziaylek .................. 188/32 |

* cited by examiner

*Primary Examiner*—Douglas C. Butler
(74) *Attorney, Agent, or Firm*—Jacox, Meckstroth & Jenkins

(57) ABSTRACT

A horizontally extending body or base member includes a forward portion and a rearward portion and has downwardly projecting teeth for engaging a wire grid mounted on a bed or floor. The forward portion of the base member supports a wheel engaging head member for relative horizontal movement between extended and retracted positions, and compression springs bias the head member to its extended position. A lock member is supported by the rearward portion of the base member for pivotal movement between released and locked positions and also has downwardly projecting teeth for engaging the wire grid. The head member carries a wheel engaging extension member for pivotal movement between retracted and extended positions. A side paddle member is also carried by the head member to resist lateral movement of the wheel, and preferably all of the members are each molded of a liquid thermoset plastics material.

22 Claims, 2 Drawing Sheets

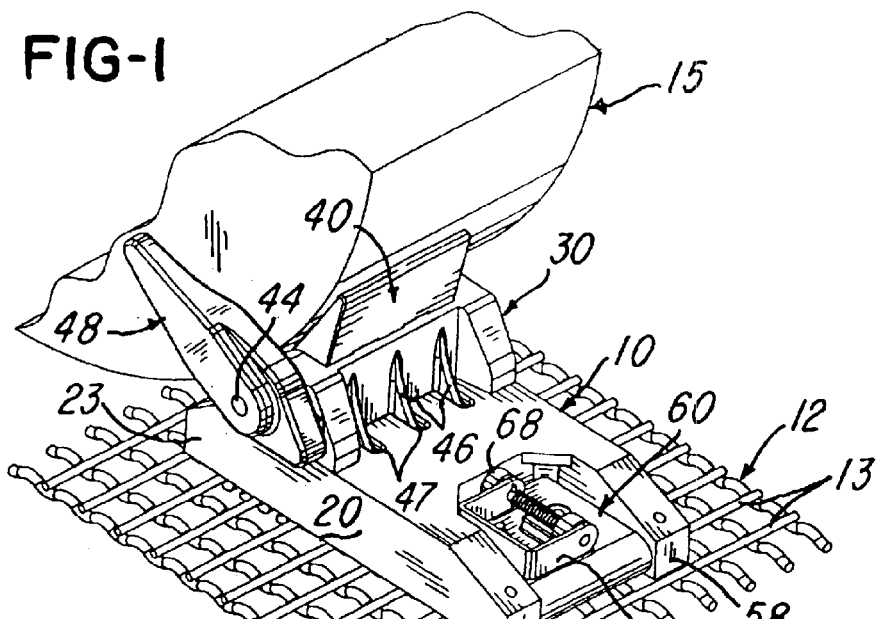
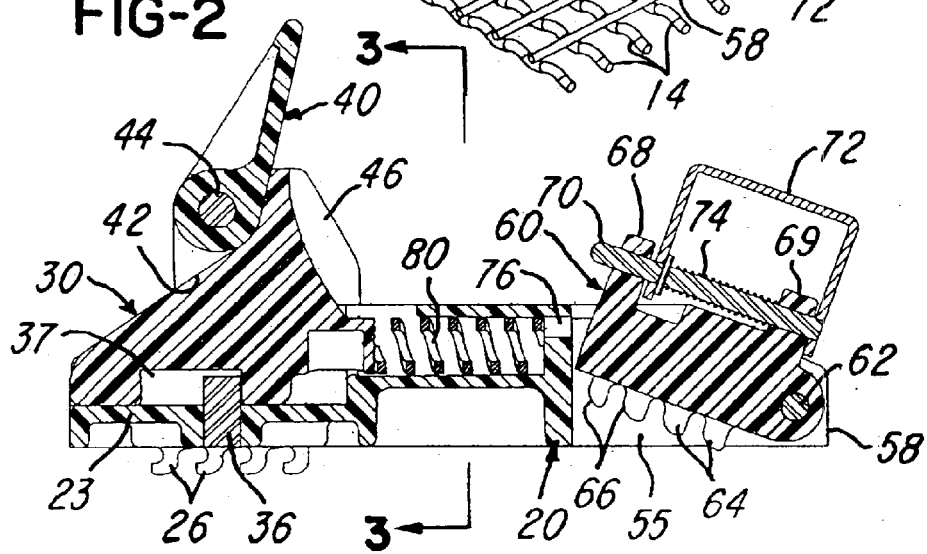
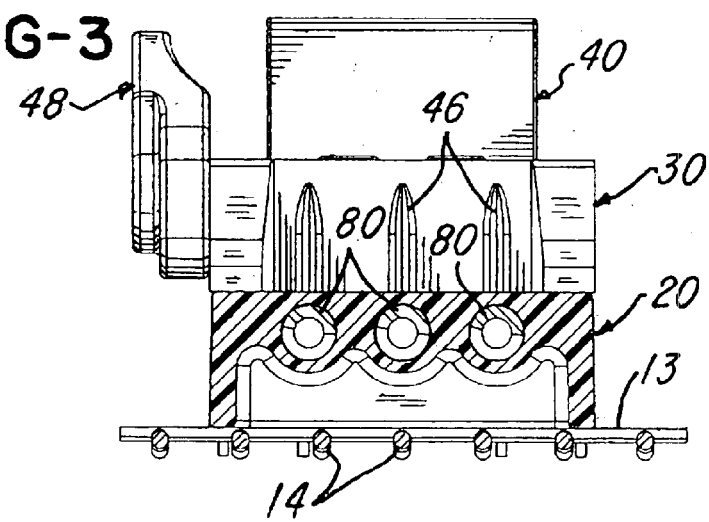

ably somewhat smaller then the diameter of the wheel

SHOCK ABSORBING VEHICLE WHEEL CHOCK

BACKGROUND OF THE INVENTION

This invention relates to wheel chocking devices or assemblies used to secure automobiles, trucks and other vehicles to the bed or floor of a transportation vehicle such as a railroad car or "railcar". For example, a commonly used wheel chock or device is disclosed in U.S. Pat. No. 5,302,063 and U.S. Pat. No. 5,312,213 and functions to confine or hold the vehicle being transported in place on the bed or floor to prevent damage to the vehicle and/or an adjacent vehicle and/or the railcar by shifting of the vehicle in response to forces encountered by the railcar or other transportation system. As disclosed in the above patents, the wheel chock attaches to a crossing wire mesh or wire grid which is secured to the floor or bed of the railcar.

One of the problems encountered with the use of wheel chocks as disclosed in the above patents results when the wheel chocks are used with wheels of a large and/or heavy vehicle, and the railcar is subjected to a sudden impact or jolt. If the force of the impact or jolt is sufficiently high, the momentum of the vehicle being transported causes the vehicle wheels to jump over their corresponding wheel chocks and/or break the chocks, sometimes resulting in the vehicle hitting one or more adjacent vehicles and causing substantial damage to the vehicles. To avoid such an accident, a wheel hold down strap system has been used, for example, as disclosed in U.S. Pat. No. 4,786,223.

SUMMARY OF THE INVENTION

The present invention is directed to an improved vehicle wheel chock assembly and which is capable of absorbing energy from a vehicle wheel due to the momentum of the vehicle when the transporting vehicle or railcar is subjected to a substantial jolt or impact. The wheel chock of the present invention is also adapted to be used with a relative large and/or heavy vehicle wheel and substantially eliminates the problem of the vehicle wheels jumping over the chocks and/or breaking the chocks and thus significantly reduces the financial loss due to damaged vehicles. The chock assembly of the invention is also adapted to be molded of a liquid thermoset plastics material which provides high strength and for economical production. In addition, the chock assembly of the invention substantially eliminates the time and cost of repairing or replacing broken wheel chocks.

In accordance with a preferred embodiment of the invention, a wheel chock assembly includes a body or base member which supports a slidable head member for movement between a forward extended position and a retracted position, and a set of compression springs are enclosed within the base member for biasing the head member to its extended position. The head member may carry a pivotal extension member which is moved between retracted and extended positions for engaging wheels of different sizes. The base member has downwardly and forwardly projecting hook-shaped teeth for engaging a wire grid attached to the bed of a transportation vehicle. A rearward portion of the base member supports a pivotal lock member which also has downwardly projecting teeth having rounded front corner surfaces for entering and engaging the wire grid. Preferably, the base member, head member, head extension member and lock member are each molded of a liquid thermoset plastics material.

Other features and advantages of the invention will be apparent from the following description, the accompanying drawings and the appended claims.

BRIEF DESCRIPTION OF THE DRAWINGS

FIG. 1 is a perspective view of a wheel chock assembly constructed in accordance with the invention and shown attached to a wire grid adjacent a relative large diameter vehicle wheel;

FIG. 2 is a longitudinal section of the chock assembly, taken before it is installed on the wire grid;

FIG. 3 is a cross-section of the chock assembly, taken generally on the line 3—3 of FIG. 2;

DESCRIPTION OF THE PREFERRED EMBODIMENT

Figure 4:
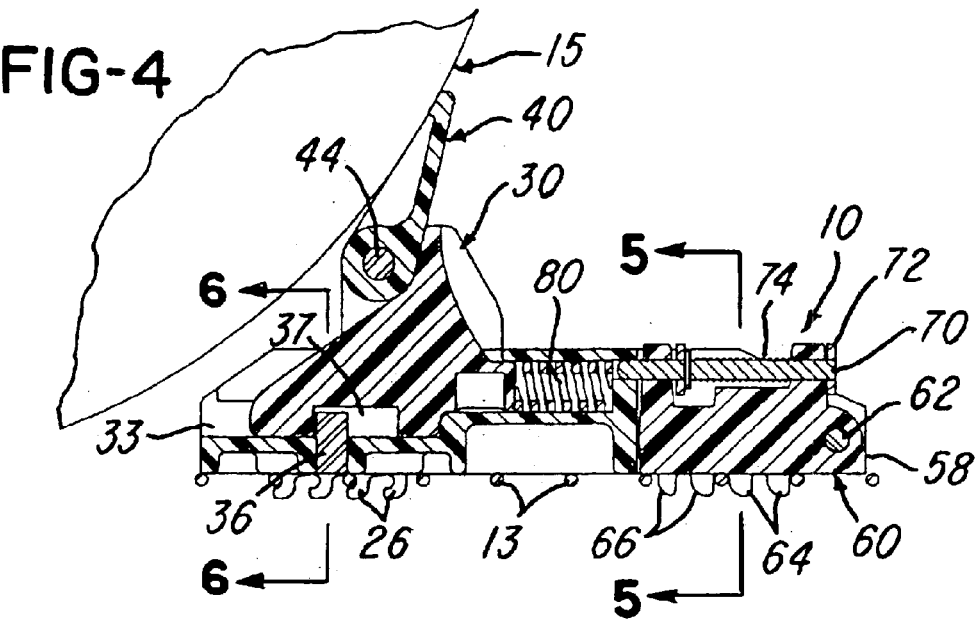
FIG. 4 is a section of the chock assembly similar to FIG. 2 and showing the chock assembly installed on a wire grid and after an impact by a wheel.
Figure 5:
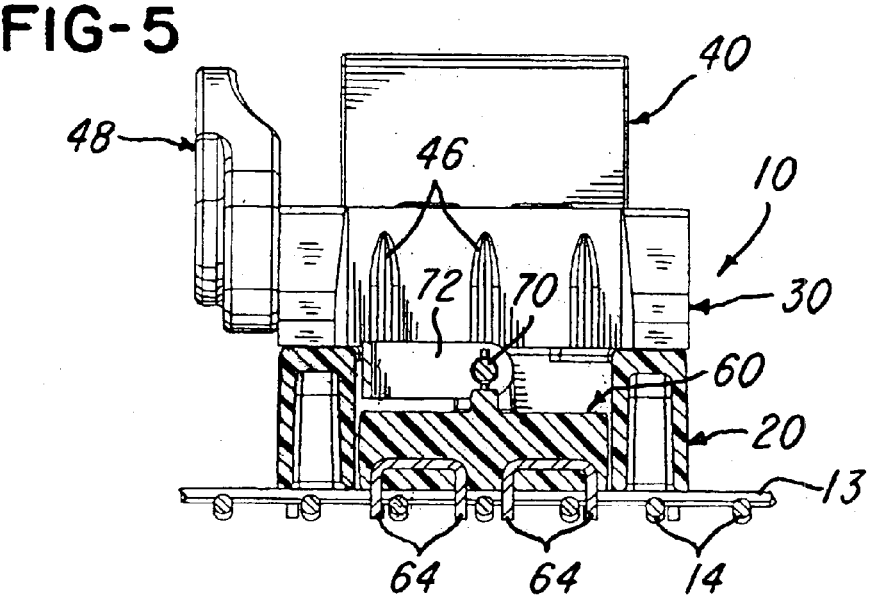
FIG. 5 is a cross-section of the chock assembly, taken generally on the line 5—5 of FIG. 4.

FIG. 1 illustrates a wheel chock assembly 10 constructed in accordance with the invention and shown installed on a wire grid 12 having parallel spaced steel wires 13 crossing and welded to parallel spaced steel wires 14. The chock assembly 10 is positioned adjacent the tire of a relatively large diameter wheel 15 as might be used, for example, on a pickup truck or a sport utility vehicle. As disclosed in above U.S. Pat. No. 5,302,063, the wire grid 12 is commonly attached to the bed or floor of a railcar. The chock assembly 10 may be attached at any desired location on the wire grid, depending on the location of the vehicle wheels.

Figure 6:
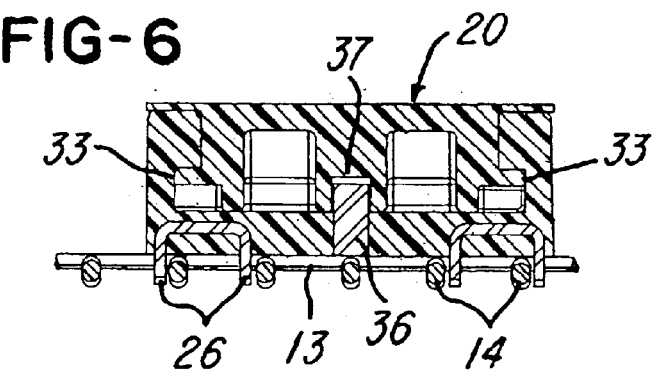
FIG. 6 is a cross-section of the chock assembly, taken generally on the line 6—6 of FIG. 4.

The chock assembly 10 includes a body or base member 20 which is molded of a liquid thermoset plastics material primarily composed of a plural component liquid monomer mixture which can be molded by a reaction injection molding (RIM) process. An example of such a product is produced by Metton America Corporation and sold under the trademark METTON. The base member 20 has a forward portion 23 which has a plurality of downwardly and forwardly projecting hook-shaped metal teeth 26 positioned to engage and hook onto the cross wires 13 of the wire grid 12. The teeth 26 are inserted into the molded base member 20 and are arranged in a plurality of laterally spaced rows with each row having a plurality of four teeth 26. The forward portion 23 of the base member 20 also supports a head member 30 for horizontal sliding movement within opposing guide tracks 33 (FIG. 6) between a forward position (FIG. 2) and a retracted position (FIG. 4). The head member 30 is molded of the same plastics material as the base member 20. A vertical metal pin 36 is inserted in the molded base member 20 and projects upwardly into a slot 37 within the bottom of the head member 30 for limiting forward movement of the head member 30 on the base member 20.

The head member 30 carries and supports a head extension member 40 which is also molded of the same material as the base member 20 and is supported for pivotal movement within a cavity or recess 42 by a stationery steel cross pin or bolt 44 projecting into laterally aligned holes within the head member 30. The extension member 40 is pivotable between a retracted position (not shown) within the recess 42 for engaging or forming a stop for a wheel having a diameter somewhat smaller then the diameter of the wheel 15. When desired, the extension member 40 is pivoted to an upwardly projecting extended position (FIGS. 1–5) for engaging or opposing the somewhat larger diameter wheel 15. The rear of the head member 30 has a plurality of laterally spaced reinforcing ribs 46 which are integrally molded with the head member and are received within corresponding slots 47 within the base member. The bolt 44 projects outwardly from the left side of the chock assembly 10 to support an arm or side paddle 48 which functions to restrict lateral movement of the wheel 15 and thereby limits lateral movement of the vehicle. The paddle 48 is secured in position on the head member by a machine screw (now shown) threaded into the adjacent side wall of the base member 20.

The body or base member 20 has a rearward end portion defining a cavity or recess 55 between parallel spaced wing portions 58. A lock member 60 is pivotally supported within the recess 55 by a cross pin or bolt 62 and is molded of the same material as is the base member 20, head member 30 and head extension member 40. The lock member 60 includes a plurality of downwardly projecting metal teeth 64 which are inserted into the mold and are arranged in four parallel spaced rows (FIG. 5) each having four teeth. Each tooth 64 has a curved or rounded surface 66 which faces downwardly and forwardly. The curved surfaces permit pivoting of the lock member 60 between an upper inclined released position (FIG. 2) and a downward horizontal lock position where the teeth 64 project between the parallel spaced wires 13 and engage the wires, as shown in FIG. 2.

The lock member 60 has a set of upwardly projecting bosses 68 and 69 which support a locking pin 70 for axial movement. A rotatable U-shaped handle member 72 has opposite leg portions secured to the lock pin 70 for moving the lock pin axially against a compression spring 74. The spring 74 biases the lock pin forwardly to its normal position where a forward end portion of the lock pin projects into a hole 76 within the base member 20 and thereby secures the lock member 60 in its horizontal lock position, as shown in FIG. 4. As shown in FIGS. 2 and 3, a plurality of parallel spaced heavy duty compression springs 80 are confined within corresponding laterally spaced bores within the base member 20 and extend between the base member 20 and the head member 30 for normally biasing or urging the head member 30 with substantial force to its forward extended position where it is stopped by the stop pin 36.

The chock assembly 10 is used by positioning the chock member on the wire grid 12 adjacent a wheel 15 and then hooking the teeth 26 onto the cross wires 13 while the lock member 60 is in its release position, as shown in FIG. 2. After the lock pin 70 it is retracted with the handle 72 and the lock member 60 is pivoted to its locked position (FIG. 4), the teeth 64 on the lock member enter into the wire grid 12 and secure the chock assembly 10 so that it cannot shift rearwardly to release the teeth 26 from the cross wires 13. In the event the vehicle wheel 15 impacts or is suddenly forced against the head member 30 of the chock assembly as a result of the momentum of the vehicle when the transporting vehicle or railcar receives a sudden jolt or impact, the head member 30 retracts rearwardly against the bias of the springs 80 so that the chock assembly 10 absorbs the energy created by the force on the chock assembly by the wheel. As a result, the chock assembly stays intact, and the head member 30 is returned to its forward extended position by the springs 80 in order to move the wheel back to its normal position.

The shock absorbing feature provided by the chock assembly 10 also avoids the tendency of the wheel 15 to jump over the chock assembly when the wheel impacts against the head member 30 of the chock assembly. While it is possible to lift the rearward portion of the chock assembly 10 from the wire grid 12 if there is no wheel adjacent the head member 30 so that the teeth 26 may be unhooked from the cross wires 13, the presence of a wheel adjacent the head member 30 holds the teeth 64 on the lock member in engagement with the cross wires 13 of the wire grid 12. The molding of the components of the chock assembly 10 with a liquid thermoset plastics material as described above also provides desirable features. That is, the molding provides for economical production of the assembly, and the material provides for substantial strength of the assembly so that breakage of the chock assembly is substantially eliminated. The chock assembly also meets all of the physical and dynamic requirements of the railroad industry for restraining vehicles shipped by railcar.

While the form of wheel chock and its method of construction herein described constitutes a preferred embodiment of the invention, it is to be understood that the invention is not limited to the precise method and form of wheel chock described, and that changes may be made therein without departing from the scope and spirit of the invention as defined in the appended claims.

What is claimed is:

1. A shock absorbing wheel chock assembly adapted to be attached to a wire grid on a transporting vehicle floor for resisting movement and impact from a vehicle wheel, said assembly comprising a base member having a forward portion and a rearward portion, a plurality of teeth projecting downwardly from said base member and adapted to engage the wire grid, a head member supported by said base member for generally horizontal movement between a forward extended position and a rearward retracted position relative to said base member and adapted to engage the wheel, and a biasing member urging said head member toward said extended position.

2. An assembly as defined in claim 1 wherein said biasing member comprises at least one compression spring extending between said base member and said head member.

3. An assembly as defined in claim 2 and including a plurality of generally parallel spaced compression springs extending between said base member and said head member.

4. An assembly as defined in claim 1 and including a lock member supported by said rearward portion of said base member for pivotal movement on a laterally extending generally horizontal axis between an upwardly inclined released position and a generally horizontal locked position, and a plurality of downwardly projecting teeth on said lock member and adapted to engage the grid wire in response to pivoting said lock member to said locked position.

5. An assembly as defined in claim 4 wherein said teeth on said lock member have rounded surfaces facing forwardly and downwardly to provide for pivoting said lock member to said locked position with said teeth on said lock member projecting into the wire grid.

6. An assembly as defined in claim 4 wherein said lock member supports a spring biased releasable latch pin for engaging said base member when said lock member is in said locked position.

7. An assembly as defined in claim 1 wherein said downwardly projecting teeth on said base member comprise forwardly projecting hook-shaped teeth on said forward portion of said base member.

8. An assembly as defined in claim 1 and including a head extension member supported by said head member for pivotal movement between a downwardly projecting retracted position for engaging a wheel having a first diameter and an upwardly projecting extended position for engaging a wheel having a second diameter larger than said first diameter.

9. An assembly as defined in claim 1 wherein said base member has parallel spaced guide tracks supporting said head member for sliding movement between said extended and retracted positions.

10. An assembly as defined in claim 1 wherein said base member and head member each comprises a solidified liquid thermoset plastics material.

11. A shock absorbing wheel chock assembly adapted to be attached to a wire grid on a transporting vehicle floor for resisting movement and impact from a vehicle wheel, said assembly comprising a base member having a forward portion and a rearward portion, a plurality of teeth projecting downwardly from said base member and adapted to engage the wire grid, a head member supported by said base member for generally horizontal movement between a forward extended position and a rearward retracted position relative to said base member and adapted to engage the wheel, at least one compression spring extending between said base member and said head member for urging said head member toward said extended position, a lock member supported by said rearward portion of said base member for pivotal movement on a laterally extending generally horizontal axis between an upwardly inclined released position and a generally horizontal locked position, and a plurality of downwardly projecting teeth on said lock member and adapted to engage the grid wire in response to pivoting said lock member to said locked position.

12. An assembly as defined in claim 11 and including a plurality of generally parallel spaced said compression springs extending between said base member and said head member.

13. An assembly as defined in claim 11 wherein said teeth on said lock member have rounded surfaces facing forwardly and downwardly to provide for pivoting said lock member to said locked position with said teeth on said lock member projecting into the wire grid.

14. An assembly as defined in claim 11 wherein said lock member supports a spring biased releasable latch pin for engaging said base member when said lock member is in said locked position.

15. An assembly as defined in claim 11 wherein said downwardly projecting teeth on said base member comprise forwardly projecting hook-shaped teeth on said forward portion of said base member.

16. An assembly as defined in claim 11 and including a head extension member supported by said head member for pivotal movement between a downwardly projecting retracted position for engaging a wheel having a first diameter and an upwardly projecting extended position for engaging a wheel having a second diameter larger than said first diameter.

17. An assembly as defined in claim 11 wherein said base member, head member and said lock member each comprises a solidified liquid thermoset plastics material.

18. An assembly as defined in claim 11 wherein said base member has parallel spaced guide tracks supporting said head member for generally horizontal sliding movement between said extended and retracted positions.

19. An assembly as defined in claim 11 and including a paddle member mounted on a side of said base member and projecting forwardly from said head member for limiting side movement of the wheel and vehicle.

20. A shock absorbing wheel chock assembly adapted to be attached to a wire grid on a transporting vehicle floor for resisting movement and impact from a vehicle wheel, said assembly comprising a base member having a forward portion and a rearward portion, a plurality of hook-shaped teeth projecting downwardly from said forward portion of said base member and adapted to engage the wire grid, a head member supported by said base member for generally horizontal movement between a forward extended position and a rearward retracted position relative to said base member and adapted to engage the wheel, a plurality of laterally spaced compression springs extending between said base member and said head member for urging said head member toward said extended position, a lock member supported by said rearward portion of said base member for pivotal movement on a laterally extending generally horizontal axis between an upwardly inclined released position and a generally horizontal locked position, a plurality of downwardly projecting teeth on said lock member and adapted to engage the grid wire in response to pivoting said lock member to said locked position, and a paddle member mounted on a side of said base member and projecting forwardly from said head member for limiting side movement of the wheel and vehicle.

21. An assembly as defined in claim 20 wherein each of said members comprises a solidified liquid thermoset plastics material.

22. An assembly as defined in claim 20 and including a head extension member supported by said head member for pivotal movement between a downwardly projecting retracted position for engaging a wheel having a first diameter and an upwardly projecting extended position for engaging a wheel having a second diameter larger than said first diameter.

* * * * *